Patented May 18, 1937

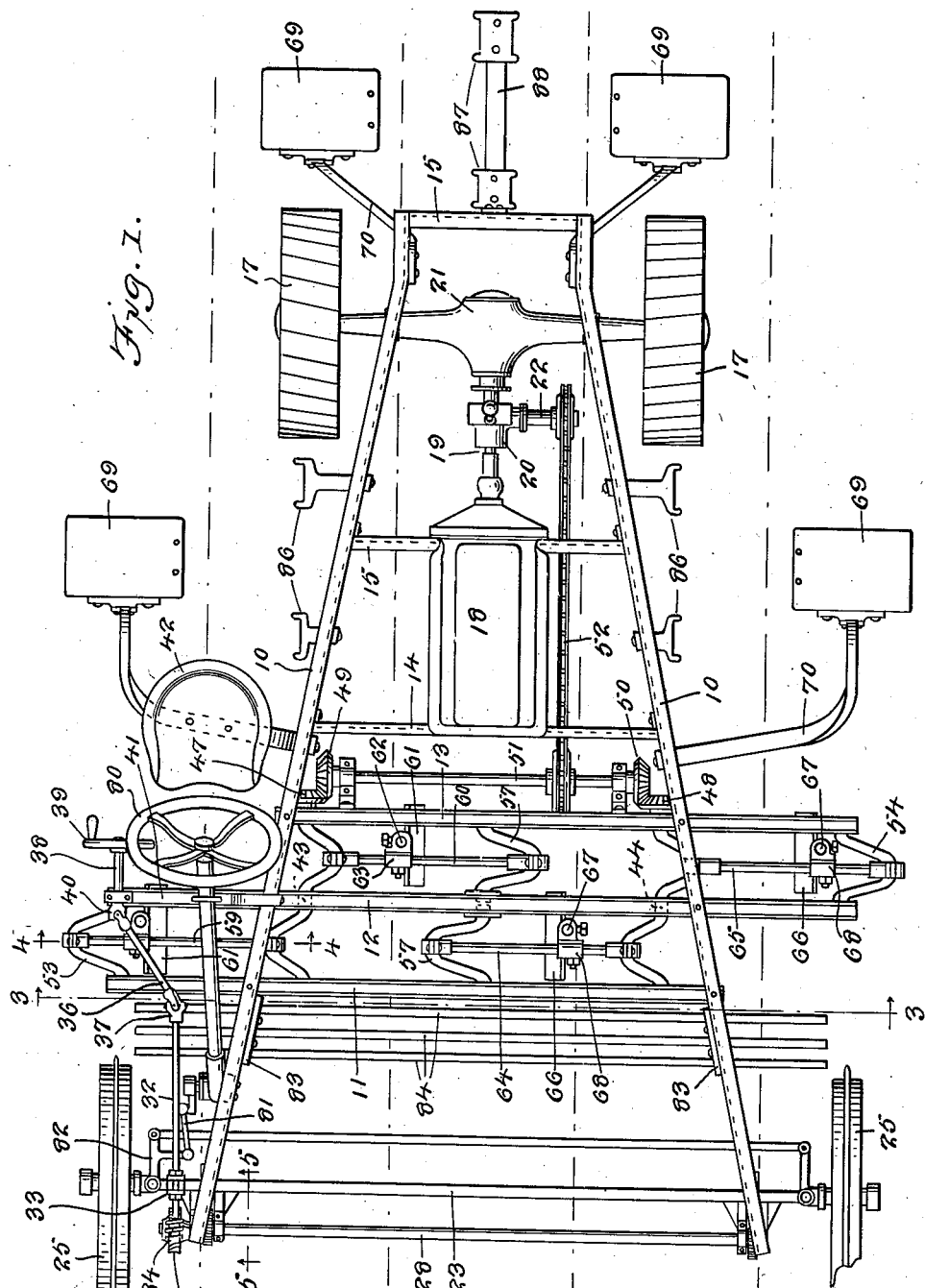

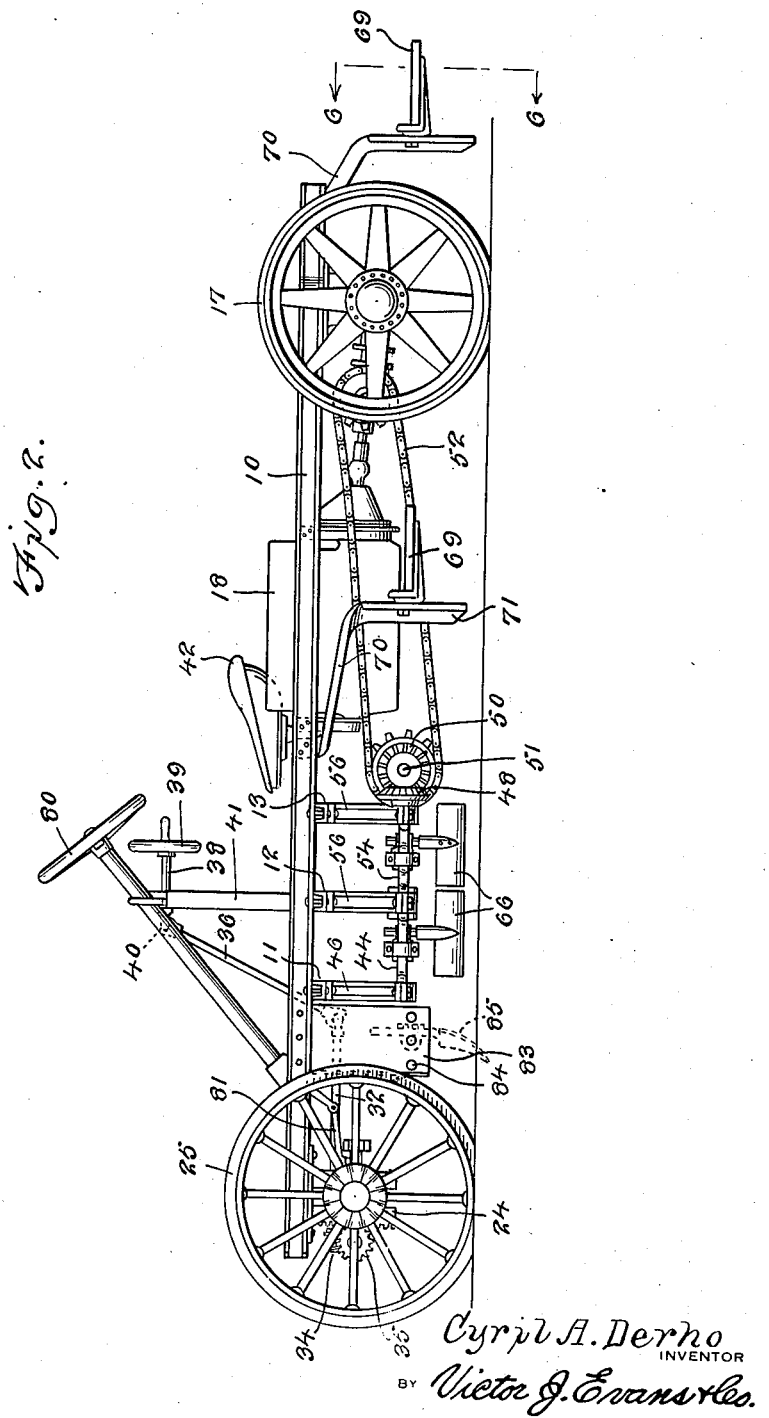

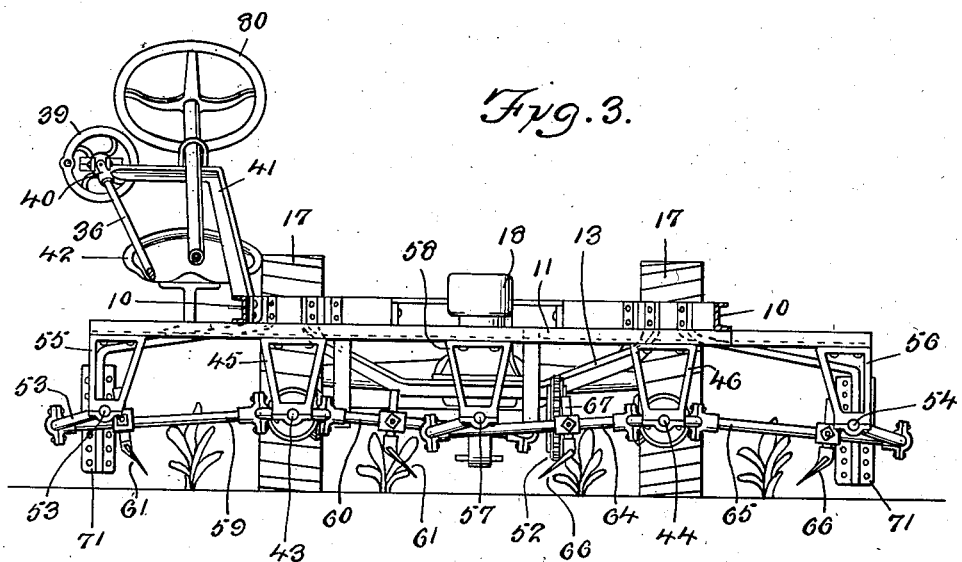

2,081,086

UNITED STATES PATENT OFFICE 2,081,086

BEET BLOCKING AND CULTIVATOR MACHINE

Cyril A. Derho, Mishawaka, Ind.

Application March 2, 1936, Serial No. 66,724

1 Claim. (Cl. 97—11)

This invention relates to blocking and cultivating machines, and has for an object to provide improved mechanism for actuating the hoes to cut away excess vegetation, as for instance, the chopping of beets or the blocking of cotton, for preventing crowding of the remaining vegetation.

A further object of the invention is to provide novel hoe actuating mechanism including connecting rods carrying the hoes and terminally connected to the cranks of a pair of crank shafts one of which cranks is driven through a complete revolution and the other of which is rocked or oscillated only through a part of a revolution so that a quick shearing cut and quick lift of the hoe from the vegetation is produced whereby to more effectively block or thin the plants with less attendant shock and jar on the apparatus than hitherto possible.

A further object is to provide novel means for raising and lowering the front of the machine from the driver's seat to accommodate the hoes to various heights of plants.

A further object is to provide novel seats for workmen equipped with hand hoes to complete the blocking of the rows should the mechanically operated hoes fail to complete the blocking or thinning necessary for the encouragement and development of the remaining plants.

A further object is to provide a machine of this character which will operate upon four rows simultaneously, the seats of the workmen being disposed so that each workman works upon a corresponding row and for this purpose novel means are provided to adapt the workman's seat for either a sitting or kneeling position, the seat being equipped with a novel chest rest for partly supporting the weight of the workman when kneeling.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming a part of this specification:

Figure 1 is a plan view of a blocking and cultivating machine constructed in accordance with the invention.

Figure 2 is a side elevation of the machine.

Figure 3 is a cross sectional view taken on the line 3—3 of Figure 1.

Figure 4 is a detail cross sectional view taken on the line 4—4 of Figure 1.

Figure 5 is a detail cross sectional view taken on the line 5—5 of Figure 1.

Figure 6 is a detail cross sectional view taken on the line 6—6 of Figure 2.

Referring now to the drawings in which like characters of reference designate similar parts in the various views, the frame is shown to comprise channel side bars 10 diverging from front to rear of the machine and connected by channel transversely disposed bars 11, 12, 13, 14, 15 and 16.

Traction wheels 17 are mounted on the narrow rear end of the frame and are driven by a gas engine 18 supported upon the cross bars 14 and 15, the propeller shaft 19 being provided with a transmission 20 between the motor and the differential 21. A stub shaft 22 disposed transversely of the frame is driven by the differential and constitutes a motor driven shaft for operating the hoes hereinafter described.

A front axle 23, which may be an I beam, is mounted to slide vertically betwen the guides 24 which extend downwardly from the side bars 10, as best shown in Figure 5, and the principal purpose of this is to permit raising and lowering of the front end of the frame upon the dirigible front wheels 25.

For raising and lowering the frame on the front axle a rack 26 is formed integral with the front edge of one of the guides 24 and meshes with a pinion 27 carried on a shaft 28 which is journaled in horizontally disposed bracket arms 29 that are bolted, as shown at 30, to the web of the axle. Contiguous to the bracket arms the axle is equipped with guide ears 31 which slidably engage the vertical guides 24. Upon rotation of the shaft 28 the pinion 27 advances upon the rack 26 and moves the rack and associated side bar 10 upwardly or downwardly as a unit according to the direction of rotation of the shaft.

For rotating the shaft 28 a shaft 32 is journaled in the legs of a U shaped bearing 33 which is bolted to the top flange of the axle near one end of the axle. The shaft is equipped with a worm pinion 34 which meshes with a worm gear 35 fixed on the shaft 28. A connecting link 36 is connected at one end to the shaft 32 by means of a knuckle joint 37 and is connected at the opposite end to the shaft 38 of a hand wheel 39, through the instrumentality of a knuckle joint 40. The handwheel is mounted on a bracket 41 which is fixed to one of the side bars 10 adjacent to the driver's seat 42 so that the hand wheel may be manipulated to rotate the shaft 28 in a direction to raise or lower the front of the frame, as it is desired, in order to accommodate the machine to operate on plants of various heights.

Referring now to Figure 1 it will be seen that a pair of crank shafts 43 and 44 are journaled in bearing brackets 45 and 46 that extend downwardly from the cross bars 11, 12, and 13 heretofore mentioned. These two crank shafts each have a pair of cranks turning oppositely to each other and both crank shafts are rotated by means of corresponding bevel gears 47 and 48 which mesh with bevel gears 49 and 50 carried by a shaft 51 which is mounted on the cross bar 13 and is driven by a conventional chain drive 52 from the above mentioned motor driven shaft 22.

By referring to Figure 3 it will be seen that a pair of crank shafts 53 and 54 each having a single crank are journaled in brackets 55 and 56 carried at the outer ends of the cross bars 11, 12 and 13 outside of the frame bars 10. The cranks of these crank shafts have greater throw than the cranks of the rotatable crank shafts 43 and 44, as for example the radius of each crank 53 and 54 may be 6 inches while the radius of the cranks of the rotatable crank shafts may be 4 inches. The purpose of this is to permit the rotatable crank shafts to oscillate the crank 53 back and forth through only part of a revolution to impart quick penetration and vertical lift of the hereinafter described hoes.

A pair of crank shafts 57 are journaled in aligned brackets 58 carried by the transverse bars 11, 12 and 13 and the crank of each shaft is a duplicate of the cranks 53 and 54 above described in that they are of greater radius than the cranks of the rotatable crank shafts.

By referring to Figure 1 it will be seen that one of the cranks of the rotatable crank shaft 43 is connected to the crank shaft 53 by means of a pitman or connecting rod 59 while the other crank is connected to the crank shaft 57 by means of a connecting rod 60 so that both connecting rods are oscillated simultaneously in the same direction. Each connecting rod carries a conventional hoe including a blade 61 having a stem 62 which is adjustably secured in an eye 63 carried by the associated connecting rod. Likewise the cranks of the rotary crank shaft 44 are connected by pitmen or connecting rods 64 and 65 to the crank shafts 57 and 54 respectively and each connecting rod is equipped with a conventional hoe 66 having a stem 67 adjustably secured in an eye 68 carried by the associated connecting rod.

It will be observed by referring to Figure 4 that while the crank shaft 43, for example, is being power driven through a complete revolution the crank shaft 53 will be oscillated through part of a revolution forwardly and then backwardly by the connecting link 59 to abruptly lower the hoe 61 to perform a shearing cut on the plants to be removed and then abruptly lift the hoe vertically. Thus a quick blocking movement of the hoe is effected without the usual shock and jar resulting from hoes being attached direct to crank arms which carry the hoes through a full revolution.

The hoes are arranged to operate on four rows of plants simultaneously. It is desirable that workmen have seats on the machine to manually complete whatever blocking operation may be necessary with hand hoes. For this purpose I provide four seats 69 mounted upon brackets 70 carried by the side bars 10, each bracket terminating in a plate 71 which is provided with perforations 72 and 73 to adjustably receive bolts 74 carried by an angle bracket 75 to which is secured the seat 69. By adjustment of the bolts 74 the seat may be tilted at an angle or raised and lowered.

For supporting the workmen in kneeling position upon the seat each seat is equipped with a removable chest rest comprising legs 76 connected at the upper end by a plate 77 and having reduced lower ends 78 which are received in openings 79 formed in the seat. The legs 76 are angular in outline to permit the workman resting his chest against the plate 77 when kneeling whereby part of his weight is supported by the chest rest.

In operation the machine is moved over the field and the crank shafts 43 and 44 are rotated with the result that the chopping hoes are lowered upon one side of the row of plants and are carried across the row destroying the plants to be removed, the hoes being then quickly lifted above the plants and returned to the initial side of the row by the oscillating pitmen or connecting links 59. A cutting stroke will occur once during each revolution of the power driven crank shafts and the relative distance apart of the cut will be controlled by the ratio of the sprocket gears of the chain drive and the meshing bevel gears and also by the ratio of the gears to the traction wheels.

During the blocking operation the driver may raise and lower the front of the frame relative to the plants at will by manipulation of the hand wheel 39.

The machine is conveniently steered by a conventional steering wheel 80 operatively connected through a link 81 to the steering knuckles 82 of the dirigible front wheels 25.

By again referring to Figures 1 and 2 it will be seen that plates 83 extend downwardly from the side bars 10 and preferably three transverse rods 84 are connected to the plates to support cultivator blades one of which is shown at 85, these blades being adjustably secured at any preferred location longitudinally on the rods, and as many blades being employed as is necessary to cultivate the rows in advance of the operation of the blocking hoes.

Foot rests 86 are secured to the side bars adjacent to the lateral workmen's seats and a pair of foot rests 87 are secured on a bar 88 which is attached to the rear transverse brace bar 16 of the frame within convenient reach of the workmen in the rear seats as shown.

From the above description it is thought that the construction and operation of the invention will be fully understood without further explanation.

What is claimed is:

In a blocking machine for growing vegetation, longitudinal frame bars, guides extending downwardly from the front ends of the bars, an axle adjustably mounted between the guides, means including a rack and pinion connection between the axle and the guides for raising and lowering the frame bars on the axle, dirigible front wheels on the axle, traction wheels on the rear ends of the axle, hoes operatively supported upon the frame, and means for oscillating the hoes transversely of the frame.

CYRIL A. DERHO.